(12) United States Patent
Lennan et al.

(10) Patent No.: US 10,530,729 B2
(45) Date of Patent: Jan. 7, 2020

(54) VIDEO RETRIEVAL (71) Applicant: Hewlett-Packard Development Company, L.P., Houston, TX (US)

(72) Inventors: Pam Lennan, San Diego, CA (US); Sabrina Kwan, San Diego, CA (US); Steven Say, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 191 days.

(21) Appl. No.: 15/114,325

(22) PCT Filed: Jan. 31, 2014

(86) PCT No.: PCT/US2014/014195
§ 371 (c)(1),
(2) Date: Jul. 26, 2016

(87) PCT Pub. No.: WO2015/116177
PCT Pub. Date: Aug. 6, 2015

(65) Prior Publication Data
US 2017/0012926 A1    Jan. 12, 2017

(51) Int. Cl.
*H04L 12/58* (2006.01)
*H04N 19/159* (2014.01)
(Continued)

(52) U.S. Cl.
CPC .............. *H04L 51/32* (2013.01); *G06F 16/40* (2019.01); *G06F 16/739* (2019.01);
(Continued)

(58) Field of Classification Search
CPC ....... H04L 51/32; H04L 51/10; H04L 67/306; G06F 21/128; G06F 17/30817;
(Continued)

(56) References Cited

U.S. PATENT DOCUMENTS 5,892,825 A    4/1999    Mages et al.
8,479,298 B2   7/2013    Keith et al.
(Continued)

OTHER PUBLICATIONS

CGES Music, "Making Aurasma Trigger Images from Videos," YouTube, Aug. 19, 2013, 1 page, available at http://www.youtube.com/watch?v=1Uaj8Fc6v84.

*Primary Examiner* — Chris Parry
*Assistant Examiner* — Weiwei Y Stiltner
(74) *Attorney, Agent, or Firm* — HP Inc. Patent Department (57) ABSTRACT

An example processor-implemented method for retrieving a video in accordance with the present disclosure is receiving an entry of a name tag identifying a first user in a video application, assigning a second user as a contact to the first user based on the received entry of the name tag in the video application, receiving, by a viewing module of the video application, an image of a still frame extracted from a portion of a video, wherein the name tag is associated with the still frame, and the video is associated with the first user, generating, by the viewing module of the video application, a trigger based on the received image, identifying the video based on the generated trigger, and providing permission for the second user to receive the video based on a verification that the second user is a contact of the first user.

16 Claims, 6 Drawing Sheets

(51) Int. Cl.

| | | |
|---|---|---|
| *H04N 21/81* | (2011.01) | |
| *H04N 21/431* | (2011.01) | |
| *H04N 21/258* | (2011.01) | |
| *H04N 19/172* | (2014.01) | |
| *H04N 21/472* | (2011.01) | |
| *G06F 16/738* | (2019.01) | |
| *G06K 9/00* | (2006.01) | |
| *G06F 16/732* | (2019.01) | |
| *H04N 21/433* | (2011.01) | |
| *H04N 1/00* | (2006.01) | |
| *G06F 16/40* | (2019.01) | |
| *H04N 1/387* | (2006.01) | |
| *H04L 29/08* | (2006.01) | |

(52) U.S. Cl.
CPC ..... *G06F 16/7328* (2019.01); *G06K 9/00751* (2013.01); *H04L 51/10* (2013.01); *H04L 67/306* (2013.01); *H04N 1/00169* (2013.01); *H04N 1/387* (2013.01); *H04N 19/159* (2014.11); *H04N 19/172* (2014.11); *H04N 21/25891* (2013.01); *H04N 21/431* (2013.01); *H04N 21/4334* (2013.01); *H04N 21/472* (2013.01); *H04N 21/8153* (2013.01); *G06F 2221/0724* (2013.01); *G06F 2221/0768* (2013.01)

(58) Field of Classification Search
CPC ................. G06F 16/739; G06F 16/40; G06F 2221/0724; G06F 2221/0768; G06F 16/7328; H04N 21/431; H04N 21/472; H04N 21/25891; H04N 21/8153; H04N 19/159; H04N 19/172; H04N 5/272; H04N 1/00169; H04N 1/387; H04N 21/4334; G06K 9/00751

USPC ........................................................ 709/206
See application file for complete search history.

(56) References Cited

U.S. PATENT DOCUMENTS

| | | |
|---|---|---|
| 2008/0160967 A1 | 7/2008 | Narasimhan et al. |
| 2008/0240490 A1* | 10/2008 | Finkelstein .......... H04N 21/235 382/100 |
| 2009/0265737 A1* | 10/2009 | Issa .................... G06F 17/30817 725/38 |
| 2010/0049788 A1 | 2/2010 | Bandaru et al. |
| 2011/0157227 A1* | 6/2011 | Ptucha .................... H04N 5/232 345/638 |
| 2011/0276881 A1* | 11/2011 | Keng .................... G11B 27/034 715/723 |
| 2012/0257048 A1* | 10/2012 | Anabuki ................ G06Q 10/00 348/135 |
| 2012/0260298 A1 | 10/2012 | Chen et al. |
| 2013/0060857 A1 | 3/2013 | Bezos |
| 2013/0061263 A1 | 3/2013 | Issa et al. |
| 2013/0103742 A1 | 4/2013 | Hsi |
| 2013/0212631 A1 | 8/2013 | Liwerant et al. |
| 2014/0214503 A1* | 7/2014 | Chircorian ............. G06Q 10/10 705/14.4 |
| 2015/0067804 A1* | 3/2015 | Maxwell ............... H04L 63/083 726/7 |
| 2015/0163545 A1* | 6/2015 | Freed ............... H04N 21/44008 725/19 |
| 2015/0187390 A1* | 7/2015 | Pacurariu ............... H04N 5/772 386/227 |
| 2017/0060862 A1* | 3/2017 | Wang ................ G06F 17/30784 |

* cited by examiner

VIDEO RETRIEVAL

BACKGROUND

With the Internet, the amount of multimedia content that can be accessed by the public has significantly grown. There are occasions where a user who once accessed particular multimedia content needs or desires to access the content again at a later time, possibly at or from a different place. Moreover, a user may decide to share multimedia content with another user. For example, a user may choose to share photos by publishing or transferring the user's digital photos that enables the user to share them with others either publicly or privately. The user may choose to use a social media platform to perform the sharing.

BRIEF DESCRIPTION OF THE DRAWINGS

Examples are described in the following detailed description and in reference to the drawings, in which.

DETAILED DESCRIPTION

Various aspects of the present disclosure are directed to retrieving a video. More specifically, and as described in greater detail below, various aspects of the present disclosure are directed to a manner by which a video is retrieved through, a link between the video and a still frame extracted from the video. Aspects of the present disclosure described herein allow one user to share a video with another user by providing the still frame extracted from the video in various forms, including printed form.

Moreover, aspects of the present disclosure described herein also disclose using a trigger, which may be a packet or other element of data derived from characteristics of the still frame extracted from the video and that can be sent to a server and used as a means to retrieve the video from a database Among other things, this approach allows the user to share video with another user by using an unmarked, clean still image frame.

Further, aspects of the present disclosure described herein allow the user to select the still frame from the video. Accordingly, the selected still frame may act as a reminder of what video is shared. Among other things, this approach may prevent the user from sharing the wrong video and may provide a more customized experience to the user.

In one example in accordance with the present disclosure, a method for retrieving a video is provided. The method comprises receiving an entry of a name tag identifying a first user in a video application, assigning a second user as a contact to the first user based on the received entry of the name tag in the video application, receiving, by a viewing module of the video application, an image of a still frame extracted from a portion of a video, wherein the name tag is associated with the still frame, and the video is associated with the first user, generating, by the viewing module of the video application, a trigger based on the received image, identifying the video based on the generated trigger, and providing permission for the second user to receive the video based on a verification that the second user is a contact of the first user.

In another example in accordance with the present disclosure, a system is provided. The system comprises a qualification engine to perform a qualification process for a trigger generation process, an extraction engine to extract still frames from the video associated with a user, a display engine to display, in a graphical user interface (GUI) for selection, the still frames qualified by the qualification process, a communication engine to receive a selection of a name tag associated with the user and identify a list of contacts for the user, and to receive a selection of one of the displayed still frames via the GUI, and a generation engine to associate the name tag with the selected still frame and to perform the trigger generation process on the selected still frame to generate a trigger for the selected still frame.

In a further example in accordance with the present disclosure, a non-transitory computer readable medium is provided. The non-transitory computer-readable medium comprises instructions which, when executed, cause a device to (i) assign a first user as a contact to a second user in response to receiving a name tag from the second user, the name tag identifying the first user, (ii) receive an image of a still frame extracted from a portion of a video, wherein the name tag is associated with the still frame, (iii) generate a trigger based on the received image, and (iv) retrieve the video using the generated trigger, wherein permission to retrieve the video is established upon the assignment of the first user as a contact to the second user.

Figure 1:
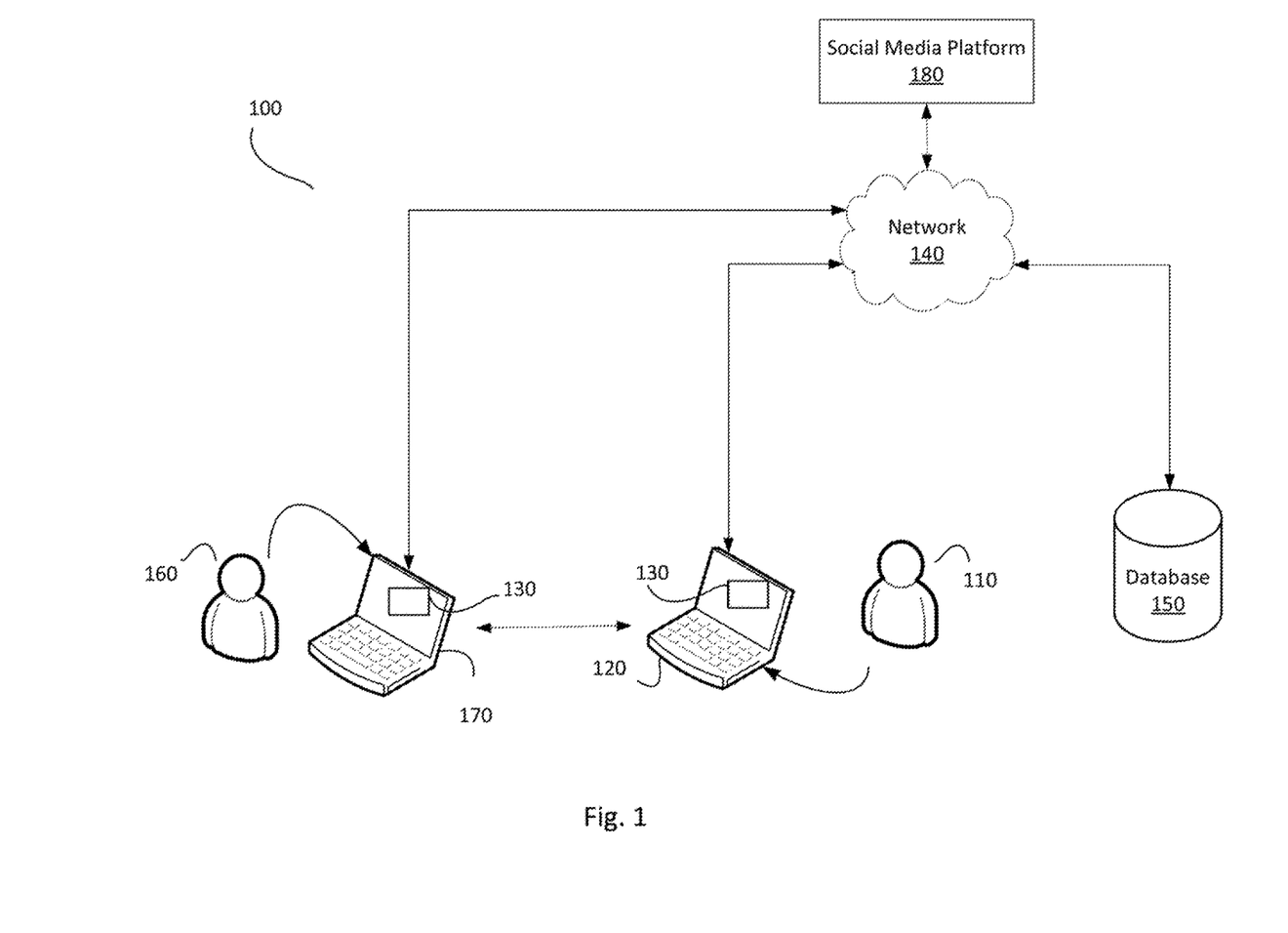
FIG. 1 illustrates an example system in accordance with an implementation.

FIG. 1 illustrates an example system 100 in accordance with an implementation. It should be readily apparent that the present illustration should not be interpreted to be limited by this particular illustrative architecture shown in FIG. 1, and the system 100 represents a generalized illustration and that other elements may be added or the illustrated elements may be removed, modified, or rearranged in many ways. For example, while the system 100 depicted in FIG. 1 includes only two multimedia devices, the system may actually comprise any number of multimedia devices, and only two have been shown and described for simplicity. The system 100 comprises computing devices 120 and 170, video application 130, a computer network 140 (or "network" 140), a database server 150, and a social media platform 180.

The system 100 may be a cloud-based sharing system, which uses computing resources (hardware and software) that are delivered as a service over a network (e.g., the Internet). The cloud-based system exposes data to be accessed by computing devices as a service over a network (e.g., network 140), and accordingly the computing devices may be connected to each other through the cloud. Cloud resources accessible via network 140 may replace, supplement, or blend with features and capabilities provided by applications and software that run locally. Applications may include, for example, one or more of identity and directory services, device management and security, synchronized storage and data services across multiple devices or platforms, and services pertaining to activities and news. Moreover, the computing devices 120 and 170 along with the video application 130 may be connected to the database server 150 and/or each other through network 140. The network 140 may comprise one or more local area networks, wide area networks, virtual private networks, the Internet, or the like, or a combination thereof.

In other example implementations, the system 100 may be peer-to-peer sharing environment, in which there may be distributed architecture without the need for central coordination, with user multimedia devices being at the same time both suppliers and consumers of data objects. Peer-to peer (P2P) technology creates a means for sharing information without requiring that all information be saved on a central, hosted server, providing direct connections between data sources and offered either access to files or replication of files.

The communications medium interconnecting the computing devices may include any combination of wired and/or wireless resources. For example, the communications medium may include resources provided by any combination of cable television networks, direct video broadcasting networks, satellite networks, cellular networks, wired telephony networks and/or data networks, wireless data networks (e.g., wireless local area networks, wireless personal area networks, etc.), and so forth. The computing devices need not be continuously connected.

The computing devices 120 and 170 may be any device capable of processing content information, interacting with a corresponding content stream, and communicating over the network. The computing devices 120 and 170 may be further capable of supporting various operations, such as and not limited to, content viewing, content recording, content play, content forwarding/rewinding, content downloading, content uploading, etc. in another implementation, the computing devices 120 and 170 may be provided with credentials for accessing/receiving content.

The computing devices 120 and 170 may be intended to be representative of a broad category of data processors. As used herein, a "computing device" may be a desktop computer, notebook computer, workstation, tablet computer, mobile phone, smart device, server, or any other processing device or equipment. Any computing device described herein (including computing devices 120 and 170) may include a processor and memory. Depending on the implementation, security features/tools may be implemented in various ways such as by a firewall, one time passwords, encryption programs, digital certificates, user application security, etc. Various combinations of these and/or other security features may be used. In some implementations, these security approaches may be layered to provide a highly secure environment in which one device may interact with another. For example, the security features may require a user to log in before transferring data from one device to another. In other implementations, the security features may require the user to provide the user's credentials or identity which is trusted by the cloud for transferring data over the cloud.

In the illustrated example implementation, the user 110 interacts with the computing device 120, and the user 160 interacts with the computing device 170. The users 110 and 160 may be connected to each other via the social media platform 180. The social media platform 180 may include but are in no way limited to social networking sites such as Twitter, YouTube, Brightcove, Facebook, and Tumblr, as well as instant messaging. The social media platform 180 may encompass services or forums which support electronic social interaction between users, and also provide for sharing of electronic content. For example, electronic content may be in the form of a video posted to a social media service and subsequently viewed and commented on by one or more users of that social media service.

The social media platform 180 allows the users to communicate with one another for various personal and professional purposes. The social media platform 180 may define relationships among different users (e.g., user accounts) of the social media platform 180. For example, the social media platform 180 may define a first user as a contact (e.g., "friend") of a second user. A contact represents the relation among the users (e.g., the first user and the second user) and shows that the users are linked to each other. Those users that have been identified by another user as a person with whom there is a preference to grant access to personal information are considered contacts. In some examples, the social media platform 180 may enable different actions, access, functionalities, or the like, between or among user accounts that are defined as being contacts of one another in the social media platform. More specifically, the social media platform 180 may allow interaction among users in which, for example, they create, share, and/or exchange information and ideas. For example, the first user may create a video file and share, the video file with his contact on the social media platform 180. In that example, after a contact between the first and second users has been established, the second user, who is a contact, is able to access multimedia information (e.g., the video) posted in an account of the first user that granted the contact.

The users 110 and 160 may become contacts of one another through the social media platform 180 and the video application 130, which will described in greater detail below. For example, the social media platform 180 may be Facebook, and the users 110 and 160 may be contacts of each other through Facebook's friendship feature, which links the users and allows them to access each others information. Such information may include, but not limited to, profile information, status updates, photos and videos.

In one implementation, the users 110 and 160 have name tags, which are unique IDs, such as usernames or alias, in one example, the users 110 and 160 may create their own name tags. The system 100 may display a pop-up box, allowing the users to enter or choose a name tag. Once received by the system 100, the system 100 may verify that the name tag is unique and associate such name tag with the user. Accordingly, name tags are used to identify the users in the system 100. In another example, the name tag information may come from the users social media account. For example, the user 110's Facebook username may act as a name tag in the system 100. Accordingly, the user 110 does not need to create a new name tag. Instead, the name tag information may be imported from the user 110's social media platform settings, for example, in the social media platform 180. The name tag along with other user information may be stored in the database 150. In some other example, the usernames may be assigned to the users 110 and 160 by the system 100. In a further implementation, where the users do not have usernames, the computing devices 120 and 170 may have guest name tags, and the users 110 and 160 may utilize the guest name tags associated with the computing devices 120 and 170. For example, the user 110, who interacts with the computing device 120, may utilize a guest name tag associated with the computer device 120. Similarly, the user 160, who interacts with the computing device 170, may utilize a guest name tag associated with the computing device 170. In one example, the computing devices 120 and 170 may comprise a plurality of guest name tags for various users that may utilize the computing devices.

In some implementations, the users 110 and 160 may become contacts of each other in the system 100 through their associated name tags. More specifically, the user 110 may need to provide the user 160's name tag. In one implementation, the name tag may be a private name tag, which requires an approval process. In such implementation, the user 110's entry of the user 160's name tag into the system may be considered as a request for the user 110 to add user 160 as a contact. Moreover, the user 160 may need to approve the user 110's request, and only then, the users 110 and 160 may be linked as contacts. If desired, the user 160 may choose to revoke his approval in the future, and delink the user 110 from his contacts list.

In the example of FIG. 1, the computing device 120 may comprise an instance of the video application 130, may run on each of the computing devices 120 and 170. The video application 130 in the computing device 120 may perform functionalities of a creation module. The video application 130 may also have additional functionalities such as functionalities of a viewing module. For example, the video application 130 in the computing device 170 may perform functionalities of a viewing module.

In some example implementations, the video application 130 may request that the user 110 logs into the system 100. If the user 110 is a new user, then the video application 130 may request information about the user 110 to create an account. In example implementations, user information may include a user's credentials such as, and not limited to, a user name, password, email address, profile photo, and other privacy/security settings. User information may also include, and not limited to, a user's first name, family name, gender, age, address, country, spoken languages, job type, employer, schools, affiliations, etc. As explained in more detailed above, during the account creation process, the user 110 may need to create a name tag associated with the user account.

In an alternative implementation, the user 110 may log into the video application 130 via the social media platform 180. For example, the video application 130 may request that the user 100 logs into his social media account on the social media platform 180 by entering his username and password associated with his social media account. Logging into Facebook via the video application 130 allows the user 110 to automatically log into the video application 130. Further, such log-in action also allows the video application 130 to access a list of contacts that the user 110 has on the social media platform 180. In another implementation, the user 110 may already be logged into the social media platform 180. Accordingly, the video application 130 may ask for the user 110's permission to access the user 110's social media account details (e.g., basic profile information, list of contacts). The video application 130 may automatically pull the user 110's credentials associated with his account on the social media platform 180 and the user 110 into the video application 130 using those credentials. In such examples, the user 110's name tag may be same as the username associated with the user 110's social media account.

The video application 130 may implement a user interface (UI) that the application 130 may output (e.g., display) on a display of the computing device 120. In one example system, such user interface may present various pages that represent functionalities available to the user 110. The user interface may facilitate interactions between the user 110 and the video application 130 by inviting and responding to user input and translating tasks and results to a language or image that the user 110 can understand. For example, the user 110 may capture or otherwise provide video data (e.g., a video file) to the video application 130.

In some implementations, the video files may be retrieved from a video/photo storage application on the computing device 120. In other implementations, the video files may be retrieved from a video database, for instance. Once the video files are available, the video application 130 may show, via the user interface, the video files to the user 110 for selection. The user 110 may select a video file from the presented video files by providing input to the user interface via an appropriate input device. For example, the user 110 may interact with the video application 130 by controlling an input device for the computing device 120 such as a keyboard, a mouse, a touch-sensitive display (e.g., touchscreen), microphone, or the like, or a combination thereof.

In an alternative implementation, a video file may be created using a plurality of video data from a number of users or user devices. For instance, a plurality of users may use their mobile devices to record digital videos. Alternatively, in another example, one user may record a plurality of digital videos on one mobile device. The plurality of video files may be sent and/or gathered at one computing device via a communication link, e.g., via a wireless network connection. The plurality of video files can be merged into one video file, e.g., containing all of the video files. In some examples, an application, e.g., a mobile application may be used for the creation of the plurality of video files and the sending and/or gathering of the plurality of video files.

In other implementations, the user 110 may be prompted to create a new video, which is then used by the video application 130. For example, the user 110 may use the computing device 120 to create a video file, e.g., record a video. For instance, the user 110 may record a birthday greeting. Other users (not shown in FIG. 1) may also record birthday greetings. In some examples, the video file may be created on a device other than the computing device 120 and may be sent to the computing device 120, e.g., via a communication link. In the example, the other users may send their video greetings to the user 110, e.g., via a wireless connection, 3G connection, 4G connection, etc. In such an example, the user 110 can be referred to as an authoring client.

In one implementation, the user 110 may select a certain portion of the video file via the user interface. In some examples, the video application 130 may generate a trigger from a still frame of the selected video and associate that trigger with the video in a remote database. Based on the selected portion of the video file, the video application 130 may qualify a plurality of still images (e.g., still frames) from the video file. The plurality of qualified still frames may be presented to the user 110, and the user 110 may select a still frame out of the plurality of still frames to be used by the video application 130 to generate a trigger to be associated with the video.

Alternatively, in the example where the user 110 receives a plurality of video files (i.e., video greetings) from other users, the application 130 of the user 110 may extract a representative still frame from each of the video greetings. For example, the representative still frames can be extracted in a number of ways. The user 110 may merge the videos into one video file containing all of the video greetings. From that, one still frame may be selected. Accordingly, one trigger may be created based on that one selected still frame (which will be described in more detail below). Alternatively, the user 110 may extract a representative still frame from each one of the individual video greetings, and as a result, have multiple representative still frames. The user 110 may use the application and multiple representative still frames to create one still frame. In an example where multiple still images are used, the user 110 can choose a background, and the multiple still frames may be merged into the background. For instance, the background may be related to the type of video file. If the users record birthday greeting videos, a birthday-themed background may be used.

The video application 130 may use the still frame to generate a trigger to be associated with the video. The trigger may be a packet or other element of data derived from characteristics of the still frame extracted from the video and that can be used as a means, e.g. as a key, to retrieve the video from a database.

In one implementation, the video application 130 may select the plurality of still frames (i.e., still images) to present to the user for selection based on a qualification process. More specifically, the video application 130 may search for still frames of the video, from which a suitable trigger may be generated and that therefore qualify for a trigger generation process. For example, the video application 130 may apply a set of trigger qualification metric(s) to still frames of the video. For the qualification process, the video application 130 may consider various characteristics of a still frame, for instance flat area distribution, shadow levels, anchor black and white color ratio of the still frame. These characteristics may be determined for the image and compared, either singly or in combination, with one or more thresholds. In one implementation, the video application 130 performing the qualification process may determine using this process that certain still frames are less suitable for trigger generation and do not qualify for the trigger generation process. Still frames comprising sparse images (e.g., basic logos), dark images (e.g., images with no or little tonal variation), images with repeated and identical features (e.g., a glass building), blurred images (including gradients) or reflective images (e.g., a glass building) may for instance not be suitable for trigger generation. Moreover, in some examples, the video application 130 performing the qualification process may determine that certain still frames do qualify for the trigger generation process, such as still frames comprising threshold levels of certain qualities such as tonal variation and contrast, or frames that include unique shapes and forms.

In one implementation, the video application 130 may determine that some of the still frames do not qualify for the trigger generation process, and accordingly, eliminate the non-qualifying frames from consideration. In some example implementations, the video application 130 may crop a non-qualifying still frame to eliminate areas with no or little information. Further, the video application 130 may extract the qualifying plurality of still frames, and as mentioned earlier, present such still frames to the user 110.

In some alternative example implementations, the video application 130 may perform the qualification process after the extraction of the still frames from the video file. In these examples, the video application 130 may for instance, automatically extract one still frame out of a set number of frames (e.g., one frame out of six). Once extracted, the video application 130 may check whether the extracted still frames qualify for the trigger generation process. In the event that the still frame does not qualify, the video application 130 may remove the non-qualifying still frames from the plurality of still frames that are extracted from the video. In the event that the video application 130 cannot identify any qualifying still frames in the selected portion of the video file, the video application 130 may alert the user 110 of that and inform the user that a new portion of the video may be selected.

In one example implementation, as mentioned earlier, the user 110 may select a still frame out of the plurality of qualified still frames to be used by the video application 130. The video application 130 may create a trigger based upon the selected still frame. The trigger may be stored in the database 150 along with the video and may associate the still frame with the video from which the still frame is extracted. The trigger for the still frame may comprise a collection of information output by a given encoding technique when applied to the still image. In some instances, the encoding technique may use various features of the still image to generate the trigger, and accordingly, the trigger may comprise encoded information related to various features of the still frame. For example, the trigger may be derived from a collection of visual information and/or characteristic information of the still frame. Such information may include geometric features (e.g., flat area distribution), color patterns (e.g., shadow levels), and/or color information associated with shapes and/or objects (e.g., black and white color ratio). Further, the trigger may reflect distinctive features of the frame such as shapes, dot-to-dot type X-Y coordinates of the shapes, patterns colors, letters numbers, symbols, etc. associated with objects/points of interest in the still frame. As a part of the trigger generation process, the video application 130 may analyze the still frames to identify the characteristics and/or visual information of the still frames. In one example implementation, the video application 130 may use object recognition technology as its trigger generation process to extract distinctive features within the still frames and gather the information related to the characteristics discussed above.

Alternatively, in another example, a plurality of triggers may be created. For example, in the implementation where the user 110 receives a plurality of video files (i.e., video greetings), the application 130 of the user 110 may extract a representative still frame from each of the video files. Based on each representative still frame, the application 130 may create a trigger for each video. For example, application 130 may create a first trigger associated with a first representative still frame from a first video and application 130 may create a second trigger associated with a second representative still frame from a second video.

In one example implementation, the database 150 may contain data including, but not limited to video files and user name tags identifying users associated with the video files. In addition, the database server 150 may contain data related to triggers, and the triggers can be used by the database server to retrieve the associated video files. For example, the first video file may be indexed in the database 150 using the first trigger and the second video file may be indexed in the database 150 using the second trigger. In addition, the first representative still frame can be linked to the first video file within the remote database using the first trigger, and the second representative still frame can be linked to the second video file within the remote database using the second trigger.

In some example implementations, the database 150 may contain personal content associated with a user. While FIG. 1 illustrates a single database, the database 150 may be configured differently in other examples. For example, the database 150 may be split into more than one database or distributed or mirrored over multiple systems. According to an example implementation, the database 150 may contain a sub-database. In one implementation, the database 150 may stand on its own and be connected to the computing devices 120 and 170. In another implementation, the database 150 may be stored locally at the premises of the computing devices 120 or 170 and content may be provided with one or more suitable interfaces.

The personal content referred to herein may, for instance, be a collection of personal assets which may include videos from local systems, social networks, other Internet sources (e.g., blogs, microblogging sites), RSS feeds, and/or emails. Further, video content may be in a format of MPEGx, H.264, AVS, AVI, etc., or any other suitable format. The still frames may be in, for example, JPEG, TIF or PDF format, or any other suitable format.

Further, the user 110 may share video files with other users (e.g., the user 160) via the video application 130. For example, the user 110 may share a still frame associated with a video file with the user 160 via the video application 130 by selecting to share the still frame via email or the social media platform 180.

The video application 130 may comprise a user interface on the computing device 170. Such interface may allow the user 160 to interact with the video application 130. The user 160 may use this interface to view video files from another user (e.g., the user 110). For example, using the user interface in the video application 130, the user 160 may hover over the still frame shared by the user 110 and view on the computing device 170 the video associated with the still frame.

In various example implementations, the user 110 may share the still frame with the user 160 in different ways. For example, the user 110 may distribute the still frame to the user 160 in a digital copy or hardcopy. More specifically, the hardcopy of the still frame may be a copy of the still frame printed on physical media, such as paper, etc. A digital copy of the still frame may be the still frame file viewed in an electronic environment. In one example implementation, the user 110 may invite the user 160 to view a digital copy of the still frame using, by way of example and without limitation, an email address, a social network platform or application, an instant messaging application, an electronic mail (email) application, a voice over IP (VoIP) application, a gaming application, online discussion groups and blogging forums, etc, in another example implementation, the user 110 may have a printed version of the still frame and share the hardcopy of the still frame with the user 160. The user 160 may obtain (e.g., receive from the first user) the hardcopy of the still frame, and use a camera in the computing device 170 to capture an image of (i.e., take a digital photograph of) the still frame.

In some example implementations, the video application 130 may review the image captured by the camera in the computing device 170 and generate a trigger from the captured image. The video application 130 may send the trigger to database server 150. The database server 150 then may determine whether a matching trigger may be found in the database. If a matching trigger is found, the video associated with the matching trigger may be retrieved. Such video may correspond to the video selected by the user 110 on the computing device 120. The database server 150 may deliver the video file to the computing device 170 for the user 160 to view.

In other example implementations, the video application 130 in the computing device 170 may have access to the trigger generated in the computing device 120 (e.g., the trigger may be downloaded to the computing device 170 from the computing device 120 or the database 150). Accordingly, the video application 130 may compare the trigger generated in the computing device 120 with the trigger generated in the computing device 170. If the triggers match, the video file associated with the trigger generated in computing device 120 may be retrieved from the database 150.

In some implementations, the user 160 may be a contact of the user 110 in order to be able to view the video file shared by the user 110. In one example, it may be considered that the users 110 and 160 are on each others contact lists in the video application 130 if they are on each other's contact lists on the social media platform 180. For example, the users 110 and 160 may be contacts (e.g., friends) on the social media platform 180 (e.g., Facebook and alike), and accordingly, may be on each others contact lists in the video application 130. In one implementation, the users 110 and 160 may choose to log into their corresponding accounts on the social media platform 180 using the video application. Once the users 110 and 160 are logged into the social media platform 180, the video application 130 may determine whether the users 110 and 160 are contacts of each other on the social media platform 180. If it is determined that the users 110 and 160 are on each other's contact lists on the social media platform 180, it is also determined that they are contacts of one another in the video application, and therefore, the users 110 and 160 may have permission to access each other s data including videos in the video application 130.

In other implementations, one of the users (e.g., user 160) may choose to log into the video application as a guest, and accordingly. In such implementations, the video application 130 may not have any information related to the contacts of the user 160. Accordingly, the video application 130 may display a prompt on the computing device 170 for the user 160 to provide the name tag associated with the user 110 in order to assign the user 160 as a contact of the user 110. In such situation, the user 160 may be prompted to enter the name tag associated with the user 110 in order to become a contact of the user 110. As described in greater detail above, the name tag associated with the user 110 may be the user 110's ID, social media username or guest login name associated with the user device 120 that the user 110 is controlling.

Similar to the implementation discussed above, there may be other Implementations, where the user 160 may be prompted to provide the name tag associated with the user 110 in order to access the files of the user 110. For example, the users 110 and 160 may not be contacts of each other on the social media platform 180. More specifically, the users 110 and 160 may both be logged into the social media platform 180 on the video application 130, but the users 110 and 160 may not be contacts (e.g., friends) of one another on the social media platform 180 (e.g., Facebook and alike). Accordingly, the video application 130 concludes that the users 110 and 160 are not on each other's contact list in the video application 130. Therefore, the user 160 is prompted to provide the user 110's name tag to be able to become a contact of the user 110. Once the users 110 and 160 are assigned to be contacts, the user 160 may access the video files associated with the user 110 when the user 110 shares the still frames representing the video files.

Figure 2A:
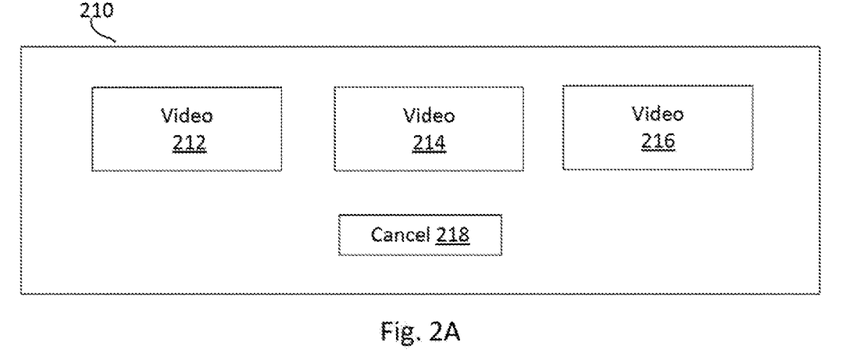
FIG. 2 illustrates an example user interfaces of a video application in accordance with an implementation.
Figure 2B:
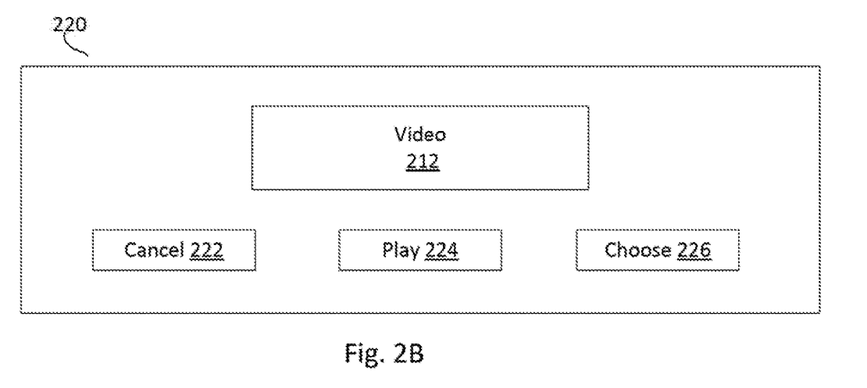
Figure 2C:
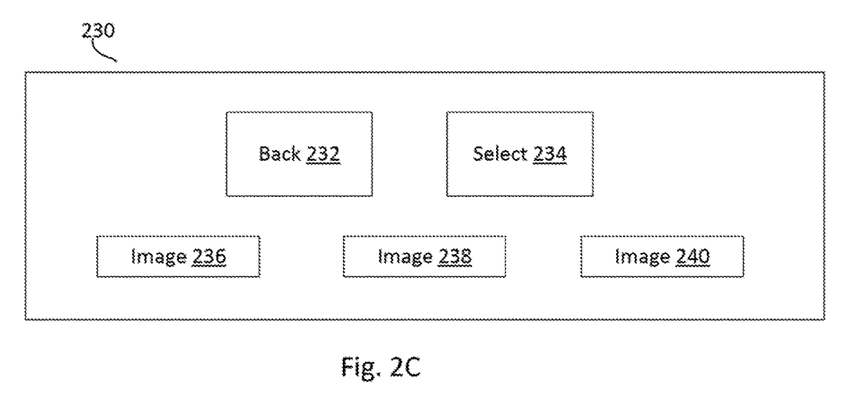

FIGS. 2A, 2B and 2C illustrate user interfaces 210, 220 and 230 of the video application 130 in accordance with an example implementation. It should be readily apparent that the user interfaces illustrated in FIGS. 2A, 2B and 2C represent generalized depictions and that other components may be added or existing components may be removed, modified, or rearranged in many ways. The user interfaces 210, 220 and 230 described herein may comprise a number of user interface components, each with a particular role, as shown in FIGS. 2A, 2B and 2C. These modules can be either functions within the computer program product described herein, sub-methods of the method described herein, and/or elements of the system described herein, for instance.

FIG. 2A illustrates the user interface 210 of the video application 130 on the computing device 120 shown in FIG. 1 in accordance with an example implementation. The user interface 210 shown comprises video files 212, 214 and 216. The user 110 may interact with the interface 210 to select one of the video files 212, 214 and 216. It should be noted that while the user interface 210 depicted in FIG. 2A includes three video files, the interface 210 may actually comprise more or fewer video files, and three files have been shown and described for simplicity. In one example implementation, the files 212, 214 and 216 may be provided by the user 110. For example, the files 212, 214 and 216 may be pulled from a video storage application on the computing device 120. In another example implementation, the files 212, 214 and 216 may be provided from an outside source. The user 110 may choose from a list of available files to initiate the process for sharing the selected file. For example, if the user clicks on the file 212, the file 212 may be selected to be shared with another user. In some implementations, the user 110 may choose to terminate the sharing process, and may click on cancel button 218. In one example implementation, clicking on cancel button 218 may close the user interface 212 of the video application 130.

FIG. 2B illustrates the user interface 220 of the video application 130 on the computing device 120 in accordance with an implementation. The user interface 220 comprises video file 212, cancel button 222, play button 224 and choose button 226. The user interface 220 may be populated based on the selection entered by the user on the user interface 210 (as shown in FIG. 2A). For example, the user interface 220 displays the multimedia file 212 as a result of the user 110's selection of the multimedia file 212. In one implementation, the user interface 220 provides the functionality of previewing and editing (e.g., cutting) a video file for the user 110 to select a portion of the video file. The user may click on play button 224, and the video 212 may start playing. While previewing the video, the user 110 may pause the video to select a portion of the video by clicking on choose button 226. In another implementation, the user 110 may click on cancel button 222 to terminate the process.

FIG. 2C illustrates the user interface 230 of the video application 130 on the computing device 120 in accordance with an implementation. The user interface 230 comprises still frames 236, 238 and 240, a back button 232, and a select button 234. The video application 130 may extract frames (e.g., the still frames 236, 238 and 240) from the video portion selected by the user 110. It should be noted that while the user interface 230 depicted in FIG. 2C includes three still frames (i.e., the still frames 236, 238 and 240), the interface 230 may actually comprise more or fewer still frames, and three files have been shown and described for simplicity.

In one example implementation, the video application 130 may identify the still frames 236, 238 and 240 based on a trigger qualification metric. Further, the user 110 may click on one of the frames 236, 238 and 240 and click on the select button 234. In another example implementation, the user 110 may not like any of the frames presented and may decide to select a different portion of the multimedia file 212 to view new frames. In that situation, the user 110 may click on the back button 232 to return to the user interface 220.

In one implementation, the selected still frame (e.g., 236, 238 or 240) may be associated with the name tag. In one example, the association may be achieved by printing the name tag on the selected still frame. For example, the name tag may be printed on the right bottom corner of the selected still frame. In another example, the association may be achieved by embedding the name tag into the selected still frame through, for example, steganography software. In a further example, the name tag be encrypted in the selected still frame.

Figure 3:
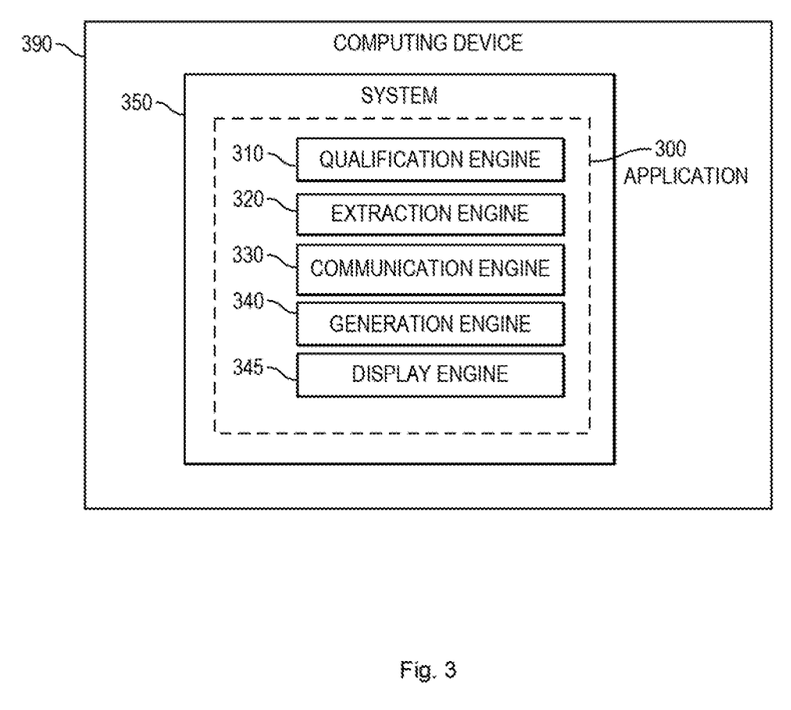
FIG. 3 illustrates an example system of a video application in accordance with an implementation.

FIG. 3 illustrates an example of a system 350 to implement a video application 300. The system 350 illustrated in FIG. 3 includes various engines to implement the functionalities described herein. The system 350 may include at least a quality engine 310, an extraction engine 320, a communication engine 330, a generation engine 340 and a display engine. Although the various engines 310-345 are shown as separate engines in FIG. 3, in other implementations, the functionality of all or a subset of the engines 310-345 may be implemented as a single engine. In some examples, video application 300 implemented by system 350 may perform any combination of the functionalities described above in relation to application 130 of FIG. 1.

Each of the engines of system 350 may be any suitable combination of hardware and programming to implement the functionalities of the respective engine. Such combinations of hardware and programming may be implemented in a number of different ways. For example, the programming for the engines may be processor executable instructions stored on a non-transitory machine-readable storage medium and the hardware for the engines may include a processing resource to execute those instructions. In such examples, the machine-readable storage medium may store instructions that, when executed by the processing resource, implement system 350. The machine-readable storage medium storing the instructions may be integrated in a computing device including the processing resource to execute the instructions, or the machine-readable storage medium may be separate but accessible to the computing device and the processing resource. The processing resource may comprise one processor or multiple processors included in a single computing device or distributed across multiple computing devices. In other examples, the functionalities of any of the engines may be implemented in the form of electronic circuitry. The video application 300 may comprise a qualification engine 310. The qualification engine 310 may review still frames identified in a portion of a video identified by a user. Based on the review, the qualification engine 310 may determine whether the still frames satisfy a trigger qualification metric. The qualification metric may be related to a trigger generation process, which may require a certain amount of flat area distribution, shadow levels, and/or black and white color ratio. Accordingly, the qualification engine 310 may consider various features of the still frames based on the trigger quality metric that may be necessary for the trigger generation process.

In one implementation, the qualification engine 310 may conclude that some of the still frames may not be qualified for the trigger generation process, and accordingly, eliminate those non-qualifying still frames. In the event that there are no qualifying frames in the portion of the video selected by the user, the qualification engine 310 may alert the user to select a new portion of the video.

The video application 300 may comprise an extraction engine 320. The extraction engine 320 may extract all the still frames that the qualification engine 310 identified as qualified for the trigger generation process. The user may select one of the qualifying still frames.

Moreover, the video application 300 may comprise a communication engine 330. The communication engine 330 may receive the still frame that the user selected from the qualifying still frame options, and make the still frame available to a generation engine 340. The generation engine 340 may create a trigger based upon the selected still frame. In one implementation, the generation engine 340 may create the trigger by utilizing an algorithm which considers various characteristics of the still frame. More specifically, the generation engine 340 may use an algorithm to identify the characteristics of the still frame and extract those characteristics, along with the geographical information, and other relevant information. As stated above, the characteristics may include, for example, shapes (e.g., flat area distribution), dot-to-dot type X-Y coordinates of the shapes, patterns, colors (e.g., shadow levels, black and white color ratio), letters, numbers, and/or symbols. In particular, the above mentioned information related to the still frame may be input into the algorithm, from which the trigger may be output. The trigger associated with the still frame may be used by video applications to retrieve the video.

Further, the video application 300 may comprise a display engine 345. The display engine 345 may be used to play video files and to show still frames to a user of the system 350. In an alternative example, where the user may use a plurality of video files, the plurality of video files can be viewed via the displayed engine 345. When the merged video file is presented, it may be presented as a compilation of the plurality of video files. For instance, in an example where ten 30-second video files are merged into one file, a single video file being five minutes long can be shown and played.

In some example implementations, the video application 300 may comprise a customization engine (not shown in the figure). The customization engine inserts the still frame into a pre-designed template. In one example, the video application 300 may provide a plurality of pre-designed template options to the user, and the user may choose a pre-designed template for the still frame.

In other implementations, where the user may use a plurality of video files, the video application 300 may comprise a merge engine to merge the plurality of video files into a merged video file. As a result, a single video file may contain all of the plurality of video files. For instance, if ten video files are associated with the still frame, a single video file can be created by merging the ten video files. Alternatively, a portion of the video file can be merged, e.g., four of the ten video files merged and six of the ten video files merged resulting in two merged video files.

Figure 4:
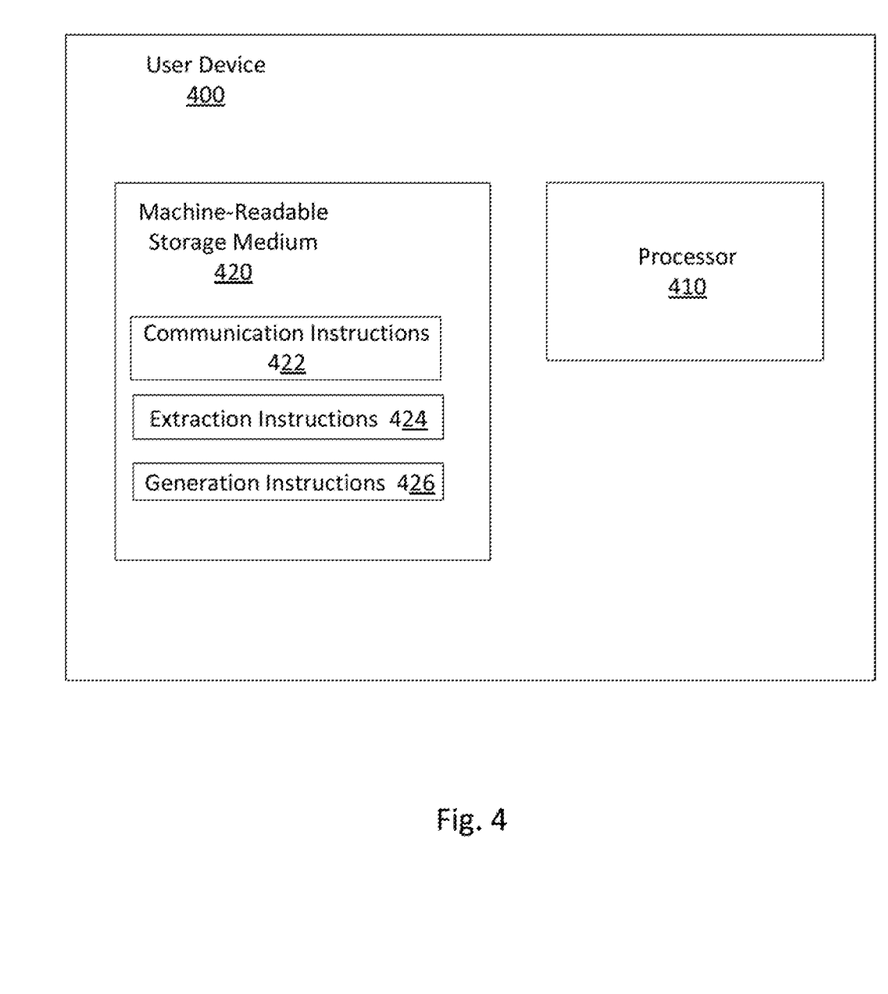
FIG. 4 illustrates an example computing device ire accordance with an implementation.

FIG. 4 is a block diagram illustrating aspects of an example computing device 400 that may be any of a variety of computing devices, such as a chip, an expansion card or a stand-alone device that interfaces with a peripheral device such as a workstation computer, a desktop computer, a laptop computer, a tablet or slate computer, a server computer, or a smart phone, among others. The computing device 400 includes a processor 410 and a machine-readable storage medium 420.

The processor 410 may be at least one central processing unit (CPU), at least one semiconductor-based microprocessor, other hardware devices or processing elements suitable to retrieve and execute instructions stored in the machine-readable storage medium 420, or combinations thereof. The processor 410 can include single or multiple cores on a chip, multiple cores across multiple chips, multiple cores across multiple devices, or combinations thereof. The processor 410 may fetch, decode, and execute instructions 422, 424, 426, among others, to implement various processing steps. As an alternative or in addition to retrieving and executing instructions, the processor 410 may include at least one integrated circuit (IC), other control logic, other electronic circuits, or combinations thereof that include a number of electronic components for performing the functionality of instructions 422, 424, 426. Accordingly, the processor 410 may be implemented across multiple processing units and instructions 422, 424, 426 may be implemented by different processing units in different areas of the computing device 400.

In one example implementation, the computer readable medium 420 may include program memory that includes programs and software such as an operating system, user detection software component, and any other application software programs. Further, the non-transitory computer readable medium 420 may participate in providing instructions to the processor 410 for execution. The non-transitory computer readable medium 420 may be one or more of a non-volatile memory, a volatile memory, and/or one or more storage devices. Examples of non-volatile memory include, but are not limited to, electronically erasable programmable read only memory (EEPROM) and read only memory (ROM). Examples of volatile memory include, but are not limited to static random access memory (SRAM) and dynamic random access memory (DRAM). Examples of storage devices include, but are not limited to, hard disk drives, compact disc drives, digital versatile disc drives, optical devices, and flash memory devices.

The instructions 422, 424, 426, when executed by processor 410 (e.g., via one processing element or multiple processing elements of the processor) can cause processor 410 to perform processes, for example, the processes depicted in FIGS. 1-3.

Communication instructions 422 may cause the processor 410 to receive a portion of a video. Extraction instructions 424 may cause the processor 410 to extract a plurality of still frames from the received portion of the video. One still frame from the plurality of the still frames is selected by a user. Further, generation, instructions 426 may cause the processor 410 to generate a trigger based on the still frame. In one implementation, there may be additional instructions that may cause the processor 410 to store the still frame along with the video file.

The computing device 400 may comprise a processing device and a non-transitory computer-readable medium. The machine-readable medium may comprise instructions that when executed cause the video application to conduct at least some of the functions described herein. The computer-readable medium may correspond to any typical storage device that stores machine-readable instructions, such as programming code, software, firmware, or the like. For example, the computer-readable medium may include one or more of a non-volatile memory, a volatile memory, and/or a storage device. Examples of non-volatile memory include, but are not limited to, electronically erasable programmable read only memory (EEPROM) and read only memory (ROM). Examples of volatile memory include, but are not limited to, static random access memory (SRAM) and dynamic random access memory (DRAM). Examples of storage devices include, but are not limited to hard disk drives, compact disc drives, digital versatile disc drives, optical devices, and flash memory devices. In some implementations, the instructions may be part of an installation package that can be executed by the processing device. In this case, the computer-readable medium may be a portable medium such as a CD, DVD, or flash drive or a memory maintained by a server from which the installation package can be downloaded and installed. In other example implementations, the instructions may be part of an application or application already installed. Here, the computer-readable medium may include integrated memory such as a hard drive.

The processing device may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof. The processing device may fetch, decode, and execute instructions stored on the computer-readable medium to implement the functionalities described above.

Figure 5:
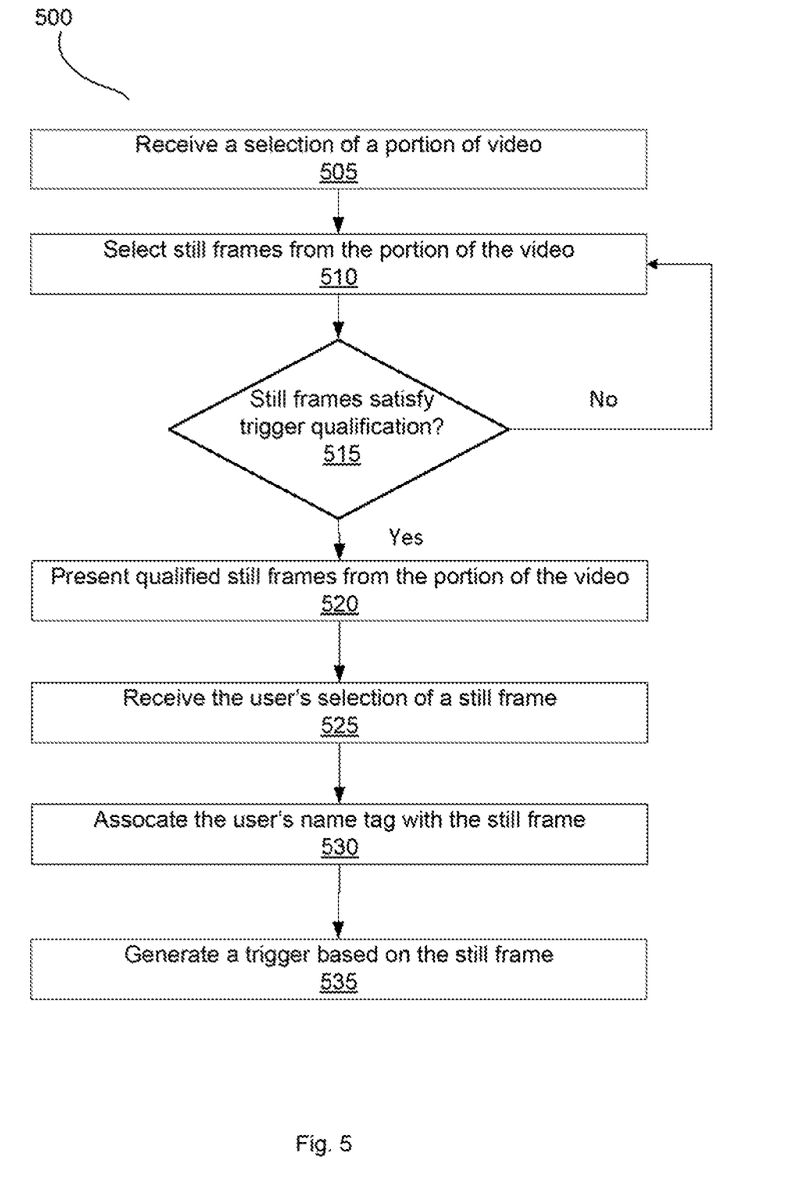
FIG. 5 illustrates an example process flow diagram in accordance with an implementation.

Turning now to the operation of the system 100, FIG. 5 depicts a process flow diagram 500 in accordance with an example implementation. It should be readily apparent that the processes depicted in FIG. 5 represent generalized illustrations, and that other processes may be added or the illustrated processes may be removed, modified, or rearranged in many ways. Further, it should be understood that the processes may represent executable instructions stored on memory that may cause a processing device to respond, to perform actions, to change states, and/or to make decisions, for instance. Thus, the described processes may be implemented as executable instructions and/or operations provided by a memory associated with the computing devices 120 and 170.

The illustrated process 500 begins at block 505, where a video application receives a user's selection of a portion of a video. In particular, in some example implementations, this process may involve a user creating an account, including a name tag, and/or logging into the video application. For example, this process may involve receiving the user data (e.g., username, password) from the user. In addition, this process may involve accessing the user's social media account (e.g., basic profile information, list of friends). Further, the process may also involve assigning a name tag to the user based on the social media account information or allowing the user to create a name tag. Once the user is logged into the video application, the user may choose to upload personal content or allow the video application access the video files on the computing device. Further, the user selects a video and identifies a portion of the video, which is communicated to the video application. In one example, the user may be the owner of the video. In other example implementations, the video may be a video file acquired from another source.

At illustrated block 510, the video application selects a plurality of still frames (e.g., still images) from the selected portion of the video. Based on the selected still frames, at block 515, the video application may determine whether the still frames meet the requirements for at least one trigger qualification process associated with a trigger generation process. In the event that the still frames qualify for the trigger generation process, at block 520, the video application presents the still frames that meet the trigger qualification metric within the selected portion of the video. In the event that the still image does not satisfy the trigger qualification requirements, the process returns to block 510, and the video application selects still frames from the selected portion of the video. In an alternative implementation, the video application may alert the user to select a different portion of the video and may return to block 505.

At bock 525, the video application receives the user's selection of a still frame from the still frames that meet the trigger qualification metric. More specifically, the video application may provide a user interface for the user to make a frame selection. At block 530, the video application associates the user's name tag with the selected still frame, in one implementation, this process may involve printing the name tag on the selected still frame. More specifically, the name tag may be positioned on the right corner of the still frame. As discussed in detail above with respect to FIG. 1, the name tag may be used in relation to creating contacts between users, and to identify the list of contacts that the video file that the still frame is extracted from may be shared with. For example, a name tag associated with a first user may be printed on a selected still frame. In that example, if the first user shares the selected still frame with a second user with the intention to share the video file associated with the selected still frame, the system uses the name tag on the selected still frame to determine whether the second user is on the first user's contact list. If the second user is identified to be on the first user's contact list, the second user may have permission to access the video file that the selected still frame is extracted from.

At block 535, the video application generates a trigger based on the selected still frame. In one example implementation, this process may involve storing the trigger in a database along with the video file that the still frame is extracted from. As discussed in detail above with respect to FIG. 1, the trigger may comprise characteristics of the still frame, and may associates the video file with the still frame. In addition, the name tag may be stored along with the trigger and the video file in the database.

Figure 6:
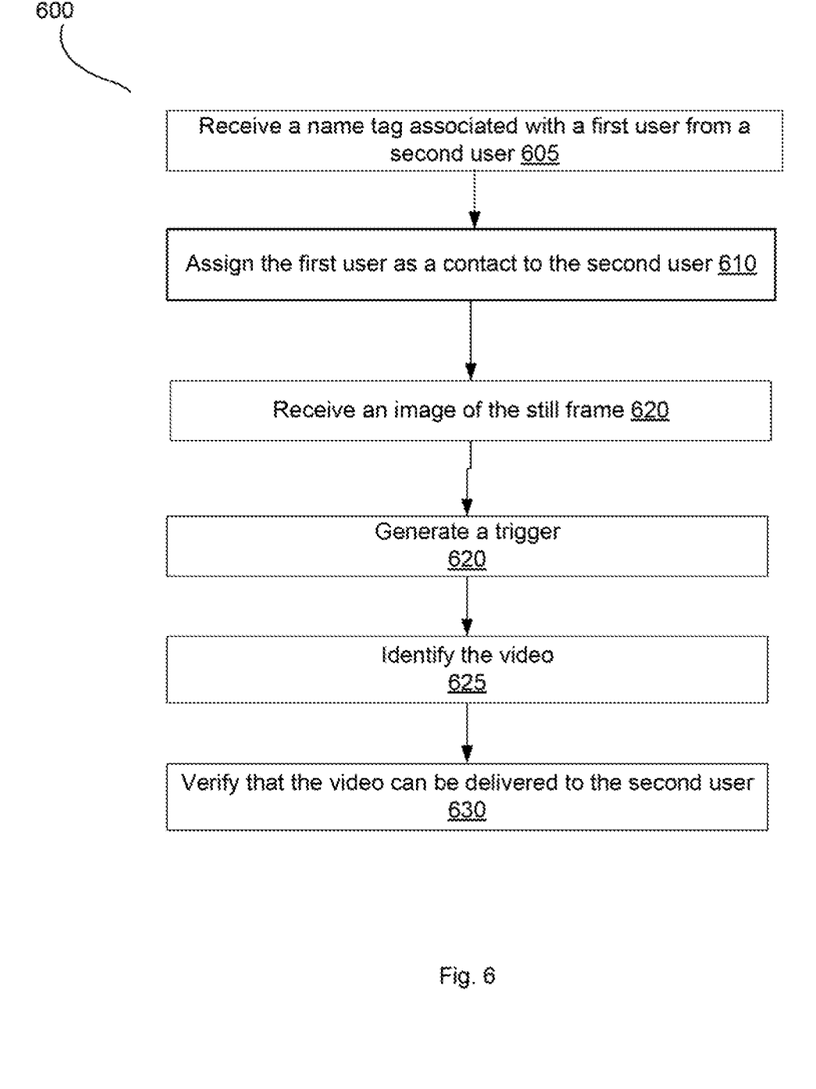
FIG. 6 illustrates another example process flow diagram in accordance with an implementation.

FIG. 6 depicts another example process flow diagram 600 in accordance with an implementation. It should be readily apparent that the processes depicted in FIG. 6 represents generalized illustrations, and that other processes may be added or existing processes may be removed, modified, or rearranged without departing from the scope and spirit of the present disclosure. Further, it should be understood that the processes may represent executable instructions stored on memory that may cause a processing device to respond, to perform actions, to change states, and/or to make decisions. Thus, the described processes may be implemented as executable instructions and/or operations provided by a memory associated with the user devices 120 and 170.

The process 600 may begin at block 605, where the video application receives a name tag entry associated with a user. More specifically, the name tag may be associated with a first user, and the name tag entry may be received from a second user. The second user may provide the first user's name tag in order to become a contact of the first user. Such contact relationship provides the second with access to files associated with the users. Accordingly, if the second user wishes to access the first user's video files, the second user focuses on becoming on a contact of the first user. In an alternative implementation, the users may be on each other's contact lists on a social media platform. Accordingly, the users may automatically be considered as contacts in the video application, and thus, the video application may disregard if a name tag entry is received.

In one implementation, the second user may get the name tag information of the first user from a still frame extracted from a video file associated with the first user. In particular, the name tag associated with the first user may be printed on the still frame, and the first user may provide an image of the still frame to the second user. In one implementation, the first user may print the still frame and provide the printed image to the second user. In another implementation, the first user may send a digital copy of the still frame to the second user (e.g., via a cloud). In a further implementation, the second user may retrieve a copy of the still frame from a database. In another implementation, the second user may find the name tag of the first user from other sources, such as correspondences, social media platforms and alike. For example, the name tag of the first user may the same as the first user's social media username. When the second user identifies the name tag associated with the first user, the video application may receive the name tag entry from the second user who is interested in becoming a contact of the first user to be able to view the video file associated with the first user.

Once the name tag is received, at block 610, the video application assigns the first user as a contact of the second user. In some implementations, this process may involve the first user accepting the second user as a contact. Such acceptance allows the second user to access the first users files (e.g., video file). In one example, the second user may have the image of the still frame that contains the name tag of the first user. However, the second user may not be a contact of the first user, and thus, may not have access to the video file associated with the still frame even though he has a copy of the still frame.

At block 615, the video application receives the image of the still frame. In particular, this process may involve the second user capturing an image of (e.g., taking a photograph of) a portion of or the entire still frame with a mobile device (e.g., the user device 170).

Once the image of the still frame is received, at block 620, the video application generates a trigger based on the image of the still frame. In particular, this process may involve processing the captured image of the still frame by extracting information related to the still frame. At block 625, the video associated with the still frame is identified. In particular, this process involves comparing the generated trigger with triggers in a database, and identifying a match. When a matching trigger is identified, the video file associated with the matching trigger is pulled from the database. In an alternative example, where a match may not be found, the video application may alert the user of an error.

At block 630, the video application provides permission for the second to receive the video based on verification that the second user is a contact of the first user. In particular, this process may involve determining that the video is associated with the first user. For example, the first user may be the creator of the video file. In another example, the video may be created by another party, but may be owned by the first user. When the association is identified, the system verifies that the second user is a contact of the first user. In one example, the system may do this by checking the contact list associated with the first user in the database. In another example, the system may check the contact list associated with the second user to see if the first user is listed on that first. If the users are contacts, the system may confirm that the second user is allowed to view the video files of the first user, and thus, may verify that the video may be delivered to the second user. The video file associated with the trigger may be delivered to the video application from the database. The viewing module provides the video file for viewing. In a case where the system determines that the users are not contacts, the video file may not be delivered to the second user. In one example, the system may alert the user about the access error. In another example, the system may not respond when the second user requests to see the video file of the first user.

In an alternative implementation, the comparison of triggers may be performed in the database. More specifically, the database may be queried with the trigger generated by the viewing module and may be checked for a matching trigger. Further, in one implementation, the metadata may be used to query the database. The metadata may include user account information, GPS information, data stamp information or alike. If a match is found, the video file associated with the trigger may be identified and delivered to the user device. In one implementation, the delivery may be directly to the user device from the database. In another implementation, the delivery may be performed through a cloud.

While the above disclosure has been shown and described with reference to the foregoing examples, it should be understood that other forms, details, and implementations may be made without departing from the spirit and scope of the disclosure that is defined in the following claims.

What is claimed is:

1. A processor-implemented method for retrieving a video, comprising:
   receiving an entry of a name tag identifying a first user in a video application;
   assigning a second user as a contact to the first user based on the received entry of the name tag in the video application;
   providing a plurality of pre-designed template options to the first user from which to choose;
   receiving, by a viewing module of the video application, an image of a still frame extracted from a portion of a video among a plurality of videos, wherein the name tag is associated with the still frame and the video is associated with the first user;
   creating a merged image of a still frame utilizing the image of the still frame extracted from the portion of the video with a second image of a still frame extracted from the plurality of videos;
   receiving a user-specified selection of a background to insert the merged image of the still frame into;
   inserting the merged image of the still frame into the background;
   inserting the merged image of the still frame into a pre-designed template chosen by the first user;
   generating, by the viewing module of the video application, a trigger based on the received image, wherein the trigger is sent to a server to retrieve the video and wherein the generating the trigger includes utilizing a trigger qualification metric based on a distinctive feature of the merged image of the still frame;
   identifying the video based on the generated trigger;
   receiving a request to send the video to the second user;
   providing permission for the second user to receive the video based on a verification that the second user is a contact of the first user; and
   providing the second user access to the video.

2. The method of claim 1, wherein the name tag is printed on the still frame.

3. The method of claim 1, wherein the name tag comprises a unique username.

4. The method of claim 1, wherein the name tag is generated based on a social media account associated with the first user.

5. The method of claim 3, wherein the first user generates the name tag.

6. The method of claim 3, wherein the name tag is assigned to the first user.

7. The method of claim 1, further comprising checking whether the second user is a contact of the first user on a social media platform, wherein the first and second users are logged into the social media platform through the video application.

8. The method of claim 7, further comprising disregarding the assigning a second user as a contact to the first user if the second user is a contact of the first user on the social media platform.

9. A system, comprising:
a processing resource; and
a storage device storing instructions that when executed cause the processing resource to:
perform a qualification process for a trigger generation process;
extract still frames from a video associated with a first user;
display, in a graphical user interface (GUI) for selection, the still frames qualified by the qualification process;
provide a plurality of pre-designed template options to the first user from which to choose;
receive a selection of a name tag associated with the first user and identify a list of contacts for the first user and receive a selection of one of the displayed still frames via the GUI;
create a merged still frame utilizing the selected still frame and a second still frame;
receive a selection of a background chosen by the first user to insert the merged still frame into;
insert the merged still frame into the background;
insert the merged still frame into a pre-designed template chosen by the first user;
associate the name tag with the merged still frame and perform the trigger generation process on the selected still frame to generate a trigger for the selected still frame, wherein the trigger is sent to a server to retrieve the video associated with the first user and wherein the trigger is generated using a trigger qualification metric based on a distinctive feature of the merged still frame;
receive a request to send the video associated with the first user to a second user; and
provide the second user access to the video associated with the first user.

10. The system of claim 9, wherein the instructions when executed further cause the processor to link the name tag with the selected still frame by printing the name tag on the selected still frame.

11. The system of claim 9, wherein the instructions when executed further cause the processor to check if the name tag is unique in the system.

12. The system of claim 11, wherein the instructions when executed further cause the processor to alert the first user and request that another name tag is provided if the name tag is not unique.

13. The system of claim 9, further comprising a database to store the video, trigger and the name tag under an account associated with the first user.

14. A non-transitory computer-readable medium comprising instructions which, when executed, cause a device to:
assign a first user as a contact to a second user in response to receiving a name tag from the second user, the name tag identifying the first user;
provide a plurality of pre-designed template options to the first user from which to choose;
receive an image of a still frame extracted from a portion of a video among a plurality of videos, wherein the name tag is associated with the still frame;
create a merged image of a still frame utilizing the image of the still frame extracted from the portion of the video and a second image of a still frame extracted from the plurality of videos;
receive a user-specified selection of a background to insert the merged image of the still frame into;
insert the merged image of the still frame into the background;
insert the merged image of the still frame into a pre-designed template chosen by the first user;
generate a trigger based on the received image and a trigger qualification metric based on a distinctive feature of the merged image of the still frame;
receive a request to send the video to the second user;
retrieve the video using the generated trigger, wherein permission to retrieve the video is established upon the assignment of the first user as a contact to the second user; and
provide the second user access to the video.

15. The non-transitory computer-readable medium of claim 14, further comprising instructions which cause the device to determine whether the first and second users are contacts of each other on a social media platform, and disregard the assigning of the first user as a contact to the second user if the first and second users are contact of each other on the social media platform.

16. The method of claim 1, wherein the name tag is associated with the still frame by being printed on the still frame.

* * * * *